Oct. 13, 1953   E. R. ZADEMACH ET AL   2,655,162
WASHING MACHINE WITH ENDLESS WORK CONVEYER
Filed July 17, 1945   8 Sheets-Sheet 4
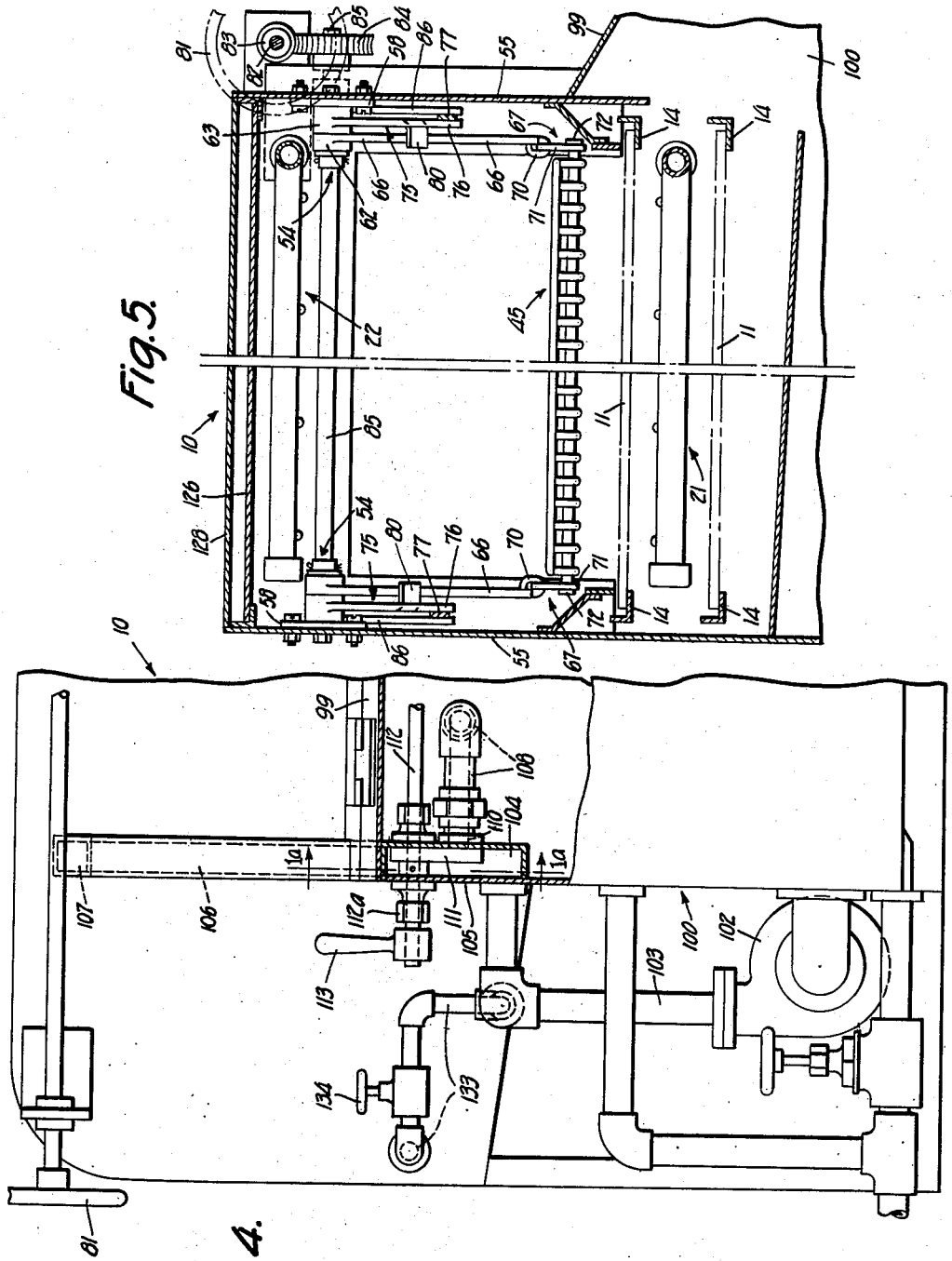
INVENTORS
Erich R. Zademach and
William W. Clarke
BY Moses, Nolte, Crews & Berry
ATTORNEYS Oct. 13, 1953 E. R. ZADEMACH ET AL 2,655,162
WASHING MACHINE WITH ENDLESS WORK CONVEYER
Filed July 17, 1945 8 Sheets-Sheet 5
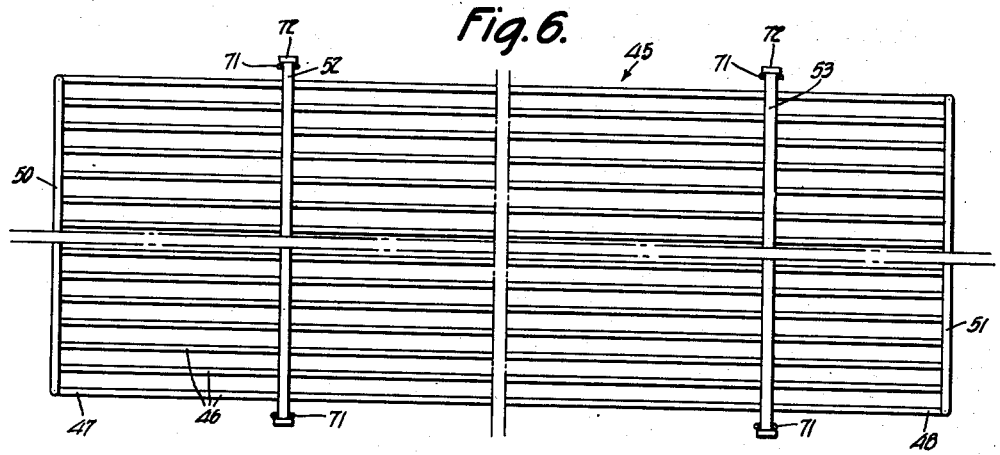
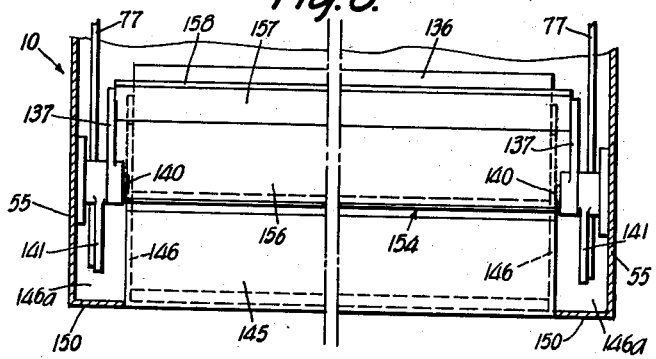
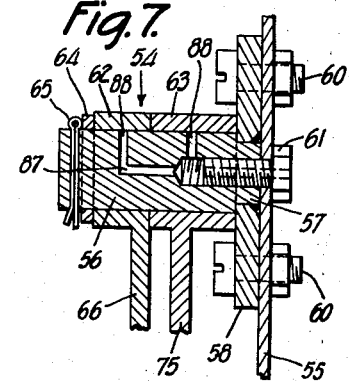
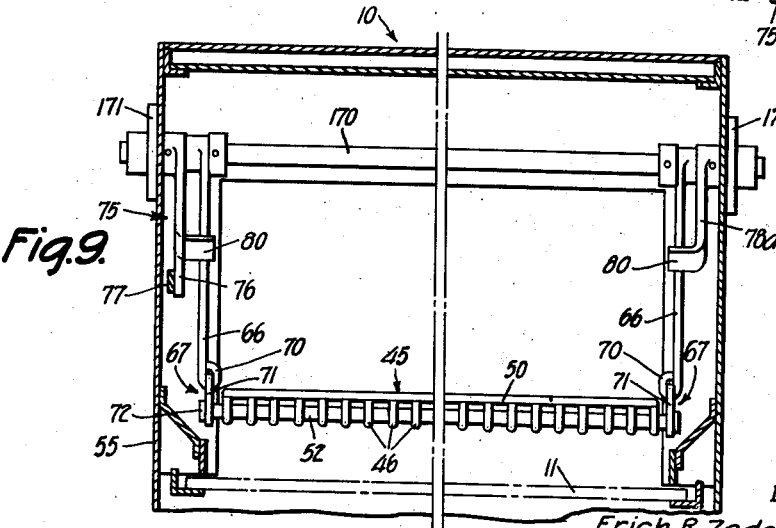
INVENTORS
Erich R. Zademach and
William W. Clarke
BY Moses, Nolte, Crews & Berry
ATTORNEYS INVENTORS
Erich R. Zademach and
William W. Clarke

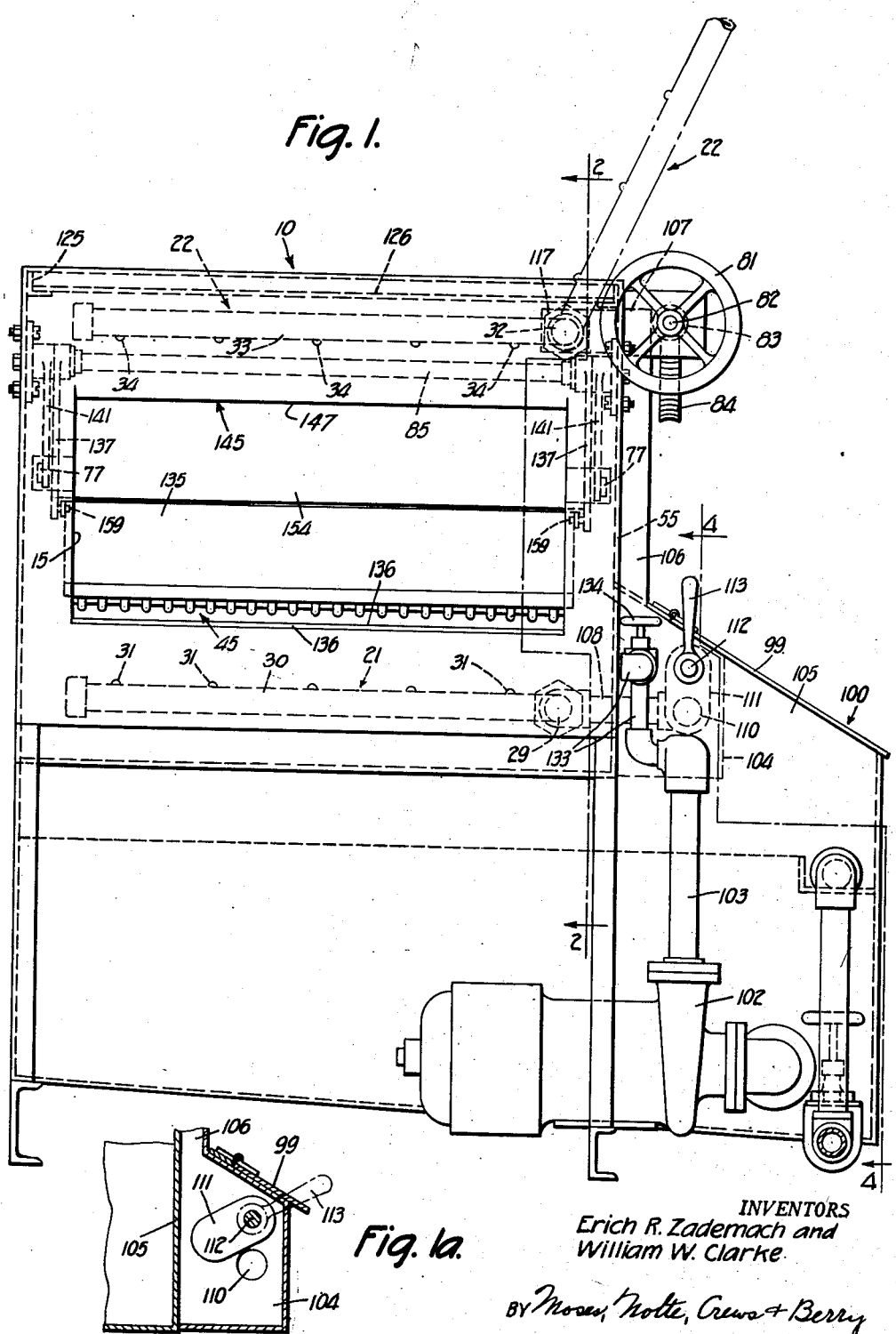

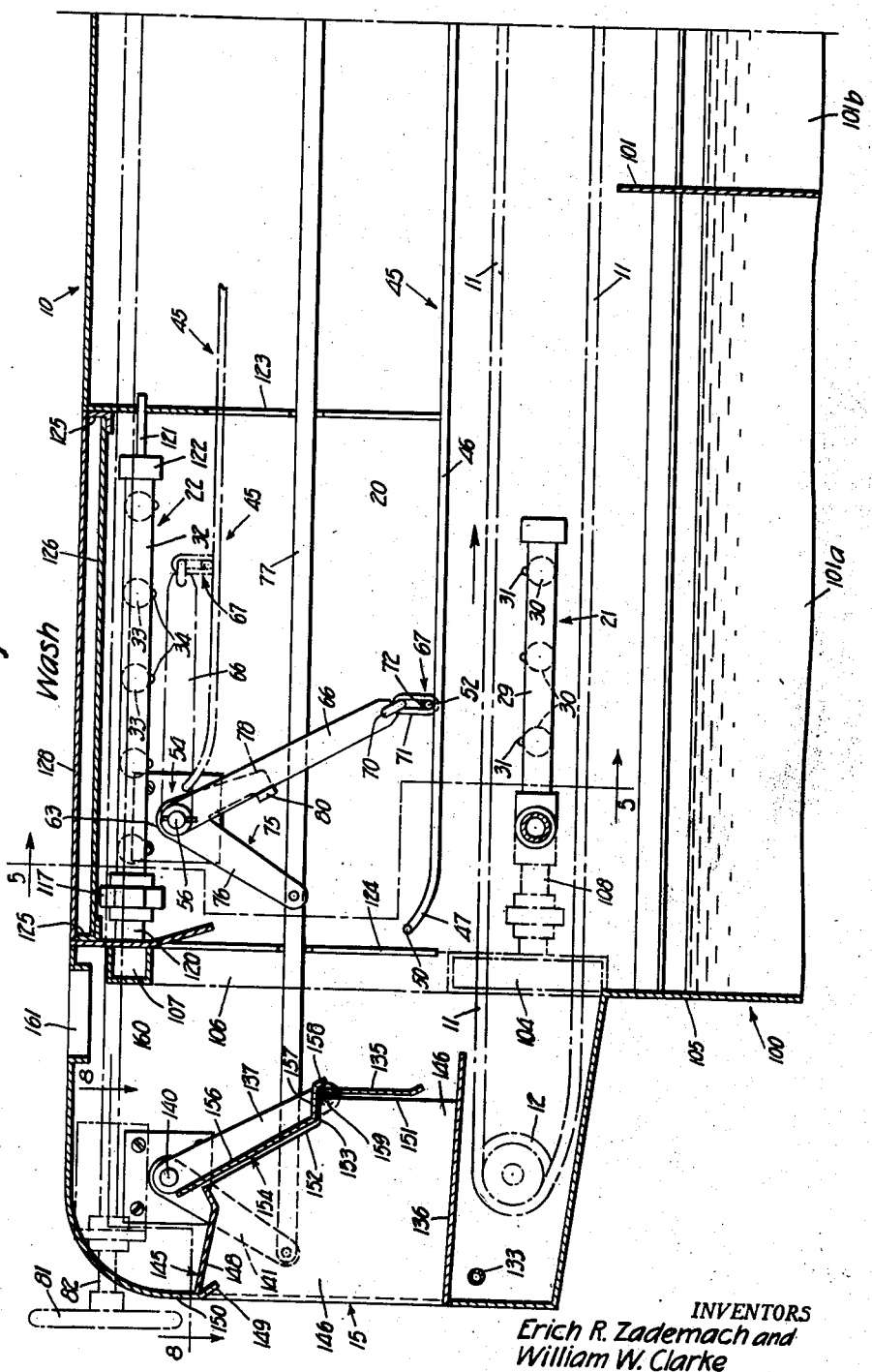

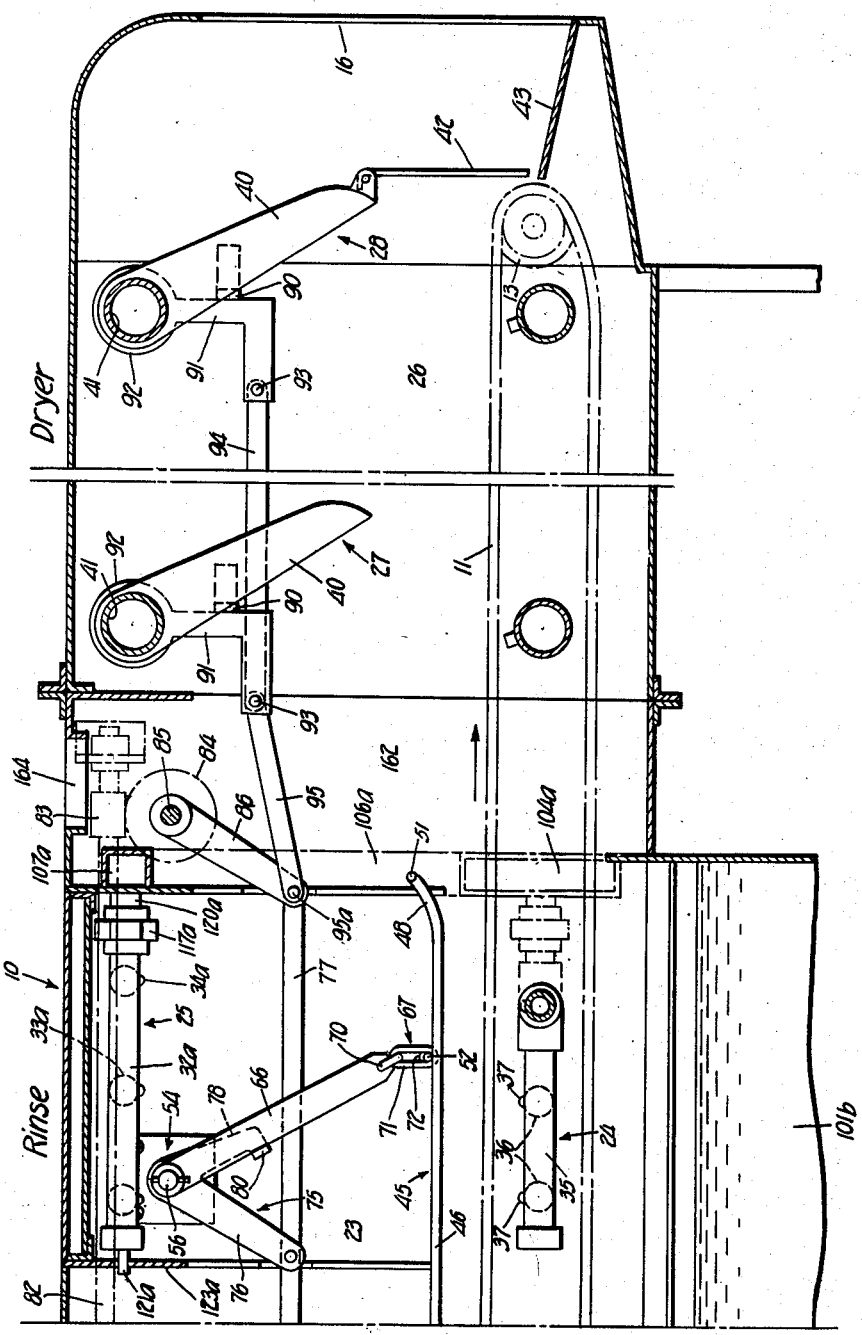

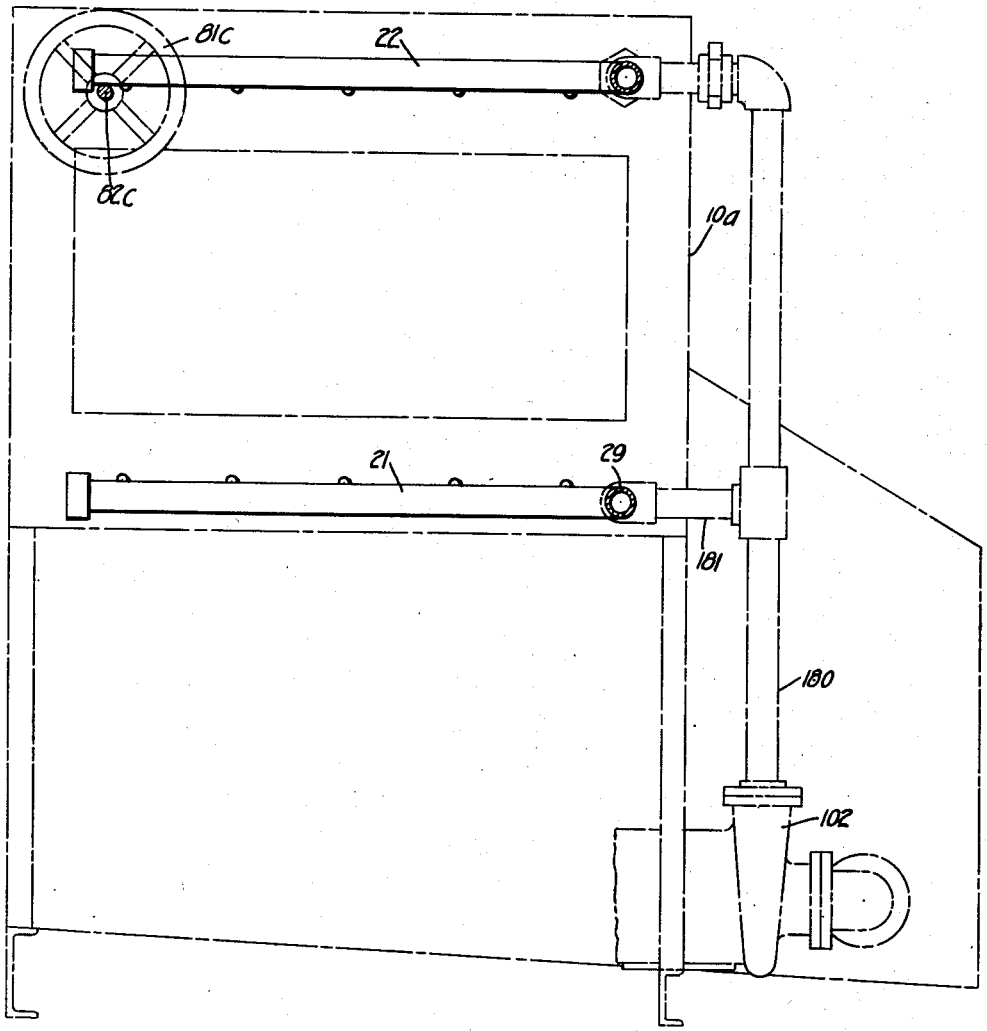

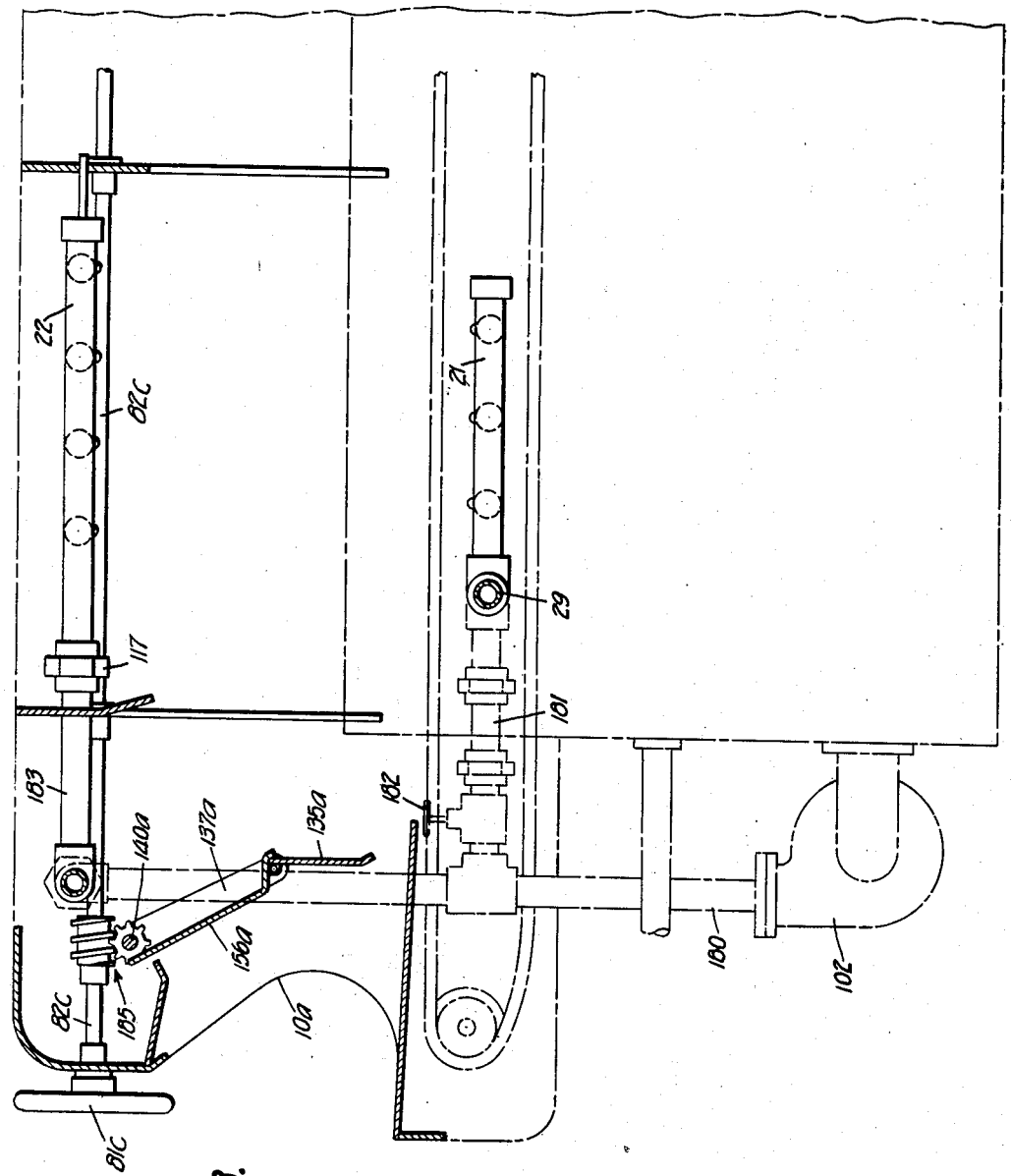

Patented Oct. 13, 1953

2,655,162

UNITED STATES PATENT OFFICE

2,655,162

WASHING MACHINE WITH ENDLESS WORK CONVEYER

Erich R. Zademach, Hillside, and William W. Clarke, Summit, N. J., assignors to Metalwash Machinery Company, Irvington, N. J., a copartnership Application July 17, 1945, Serial No. 605,589

7 Claims. (Cl. 134—125)

The present invention relates to a machine for treating articles while they are being conveyed through a treating chamber, and more particularly to a machine of this general type in which the articles while in transit through said chamber are treated with a liquid, such as a washing and rinsing liquid, and are then dried by air blowing operations. The machine of the present invention is an improvement in the general type of machine shown in U. S. Patents 2,334,854 and 2,175,677.

In a machine of the general type referred to, while the articles are being conveyed through the treating chamber, liquid, such as washing and/or rinsing liquid, is projected upwardly against the moving articles with considerable force. This action sometimes causes the articles to be vertically displaced or bounced as they are moving through said chamber.

Also, in a machine of the general type described, there is provided one or more nozzles which are mounted for pivotal adjusting movement, and which are adapted to project hot air against the transit articles to dry them. These nozzles can be pivotally adjusted about their suspension supports according to the height of the articles to be treated.

One object of the present invention is to provide a machine of the general type referred to having a mechanism by which the vertical movement of the articles as they are being conveyed through a treating chamber is restricted or restrained without interfering with the free transit movement of said articles.

Another object of the present invention is to provide means for adjusting the article restricting mechanism to accommodate said means to the height of the articles being treated.

A further object is to provide means correlating the adjustment in the article restricting or hold down mechanism with the nozzle adjusting means, so that the adjustment of said mechanism and the drying nozzle or nozzles is effected simultaneously and to a corresponding amount in accordance with the height of the articles to be treated.

Another object is to provide new and improved pipe fitting and circulating means by which the wash and rinse liquid in the treating chamber is effectively and efficiently carried to the different wash and spray nozzles without materially straining the pipes and fittings, and in a manner to permit easy detachment or attachment of said pipes and fittings out of or into position.

A further object is to provide means whereby upper wash and rinse nozzle units are rendered readily accessible and are readily movable in position to permit ready access to the interior of the chamber from the top thereof.

Another object is to provide a swinging entrance gate for the treating chamber, and a hood structure so constructed and correlated with said gate as to substantially prevent the escape of gas or fumes from said chamber through the entrance opening of said chamber, while permitting free movement of the articles into said chamber through said opening.

Various other objects, features and advantages of the invention will be apparent from the following particular description, and from an inspection of the accompanying drawings, in which:

Fig. 1 is a front end view of a form of machine embodying the present invention;

Fig. 1a is a sectional detailed view of the valve for controlling part of the circulating system to one of the wash water nozzle units taken along line 1a—1a of Fig. 4;

Fig. 2 is a vertical longitudinal section of about one-half of the machine taken approximately along the line 2—2 of Fig. 1;

Fig. 3 is a vertical longitudinal section of the other part of the machine forming a continuation of Fig. 2 and also taken approximately along the line 2—2 of Fig. 1;

Fig. 4 is a front side elevation partly in section of the machine taken on line 4—4 of Fig. 1 and showing the wash liquid circulating system;

Fig. 5 is a transverse section of the machine taken along the line 5—5 of Fig. 2;

Fig. 6 is a top plan view of a grid or hold-down plate forming part of the article restricting mechanism;

Fig. 7 is a section showing a detail of the pivotal supporting device forming part of the article restricting mechanism;

Fig. 8 is a sectional plan view of one end of the machine showing details around the swinging entrance gate of the machine and taken along lines 8—8 of Fig. 2;

Fig. 9 is a section similar to Fig. 5, but showing a modified form of mechanism for operating and adjusting the article restricting means;

Fig. 12 is a front diagrammatic end view of another form of machine embodying the present invention; and Fig. 13 is a longitudinal diagrammatic section of the forepart of the machine shown in Fig. 12.

Figure 10:
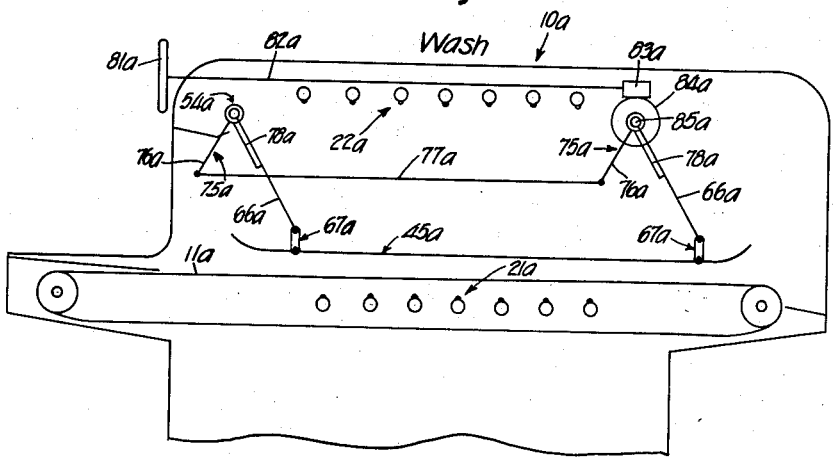
Fig. 10 is a diagrammatic view of a form of machine in which a mere washing operation is carried out.

Referring to Figs. 1 to 9 of the drawings, the treating chamber 10 has therein an endless conveyor belt 11 which is arranged to travel around end sprockets 12 and 13, and which has its upper and lower runs supported on rails 14 (Fig. 5). The chamber 10 has an entrance opening 15 at one end, and an exit opening 16 at the other end, and the articles to be treated are adapted to be conducted through the chamber between said openings upon the upper run of the conveyor belt 11.

The treating chamber 10 is divided into a wash compartment 20 where the articles while in continuous transit are washed by a pair of lower and upper spray units 21 and 22, a rinse compartment 23 where the articles are cleansed with rinse water from a pair of lower and upper spray units 24 and 25, and a drying compartment 26 where the articles are subjected to the action of hot drying air from a pair of pivotally suspended nozzles 27 and 28.

The lower wash spray unit 21 is disposed between the two horizontal runs of the conveyor belt 11, and comprises a horizontal header or manifold pipe 29 supplied with wash liquid from a circulating system to be described, and a series of parallel horizontal pipes 30 each connected at one end to said header 29, and having a series of nozzles 31 through which the wash liquid is sprayed upwardly with substantial force through the upper run of the conveyor belt 11, and against the articles being carried by said conveyor belt run. The belt 11 is of open construction to permit the projection of the wash liquid therethrough.

The upper wash spray unit 22 comprises a horizontal header or manifold pipe 32, and a series of parallel horizontal pipes 33 connected at one end to said header and having a series of nozzles 34 through which the wash liquid is sprayed downwardly against the articles in transit.

In the rinse compartment 23, the lower rinse spray unit 24 which is disposed between the two runs of the conveyor belt 11, comprises a horizontal header 35 having connected thereto at one end a series of horizontal parallel pipes 36 provided on their upper sides with spray nozzle 37 through which the rinse water is projected upwardly with substantial force through the upper run of the conveyor belt 11, and against the articles being carried by said belt.

The drying nozzles 27 and 28 are constructed and supported in a manner shown in U. S. Patent 2,334,854, and each comprises a comparatively large duct 40 having a wide nozzle opening at its lower end, and pivotally supported at its upper end to bearing tubes 41, through which the hot air from a heating chamber (not shown) is delivered for projection through said nozzle opening. The nozzles 27 and 28 are each so shaped and supported that the hot air therefrom is projected in a direction generally opposed to the direction of travel of the articles. The end nozzle 28 carries a swinging exit gate 42 across the discharge opening 16, and near one end of a discharge platform 43 disposed at the discharge end of the conveyor belt 11.

As the articles are carried by the upper run of the conveyor belt 11 through the treating chamber 10, and are subjected to the force of the wash and rinse water, especially from the lower spray units 21 and 24, these articles are apt to bounce or be displaced upwardly. In order to limit the extent of vertical displacement of these articles without interfering with their free transit through the chamber 10, there is provided above the upper run of the conveyor belt 11 a confining substantially horizontal plate or hold-down unit 45 desirably of open construction, so as not to interfere with the projection of wash and rinse water to the transit articles from the upper spray units 22 and 25. The open construction of the plate 45 also prevents interference with the sprays from lower units 21 and 24. This confining plate 45 is desirably in the form of a grid, and in the specific form shown, comprises a series of horizontal bars 46, (Fig. 6) bent gradually upwardly at their forward ends 47, and also, if desired, at their rear ends 48, and held together in parallel relationship by means of end transverse bars 50 and 51, and intermediate transverse bars 52 and 53, welded or otherwise rigidly affixed to said parallel grid bars 46.

For supporting the grid plate 45 in a manner to permit its easy vertical adjustment according to the height of the articles being transported through the chamber 10, there is attached to each side wall 55 of the treating chamber 10 a pair of pivot supports 54, (Figs. 5 and 7) the supports on both side walls being arranged in aligned pairs. Each of these pivot supports 54 includes a pivot stud 56 having a neck 57 of reduced diameter extending with a snug fit through an opening in a mounting plate 58, and welded thereto to form a fixed unit therewith. This mounting plate 58 is secured to the chamber wall 55 by means of bolts 60.

In order to more firmly hold the pivot stud 56 in position with respect to the chamber wall 55, a screw stud 61 passes through said chamber wall 55, and is threaded axially into the pivot stud 56. This stud 61 also serves to close the lubricating passages in the pivot stud 56, as will be more fully described.

Embracing each pivot stud 56 with a rotatable fit are two hub sleeves 62 and 63, retained on said pivot stud against outward axial movement by means of a washer 64 and a cotter pin 65 passing through the outer end of the pivot stud 56.

The hub sleeve 62 has integral or otherwise rigid therewith one end of an arm 66, the other end of which supports the grid plate 45 by a yieldable or lost-motion connection 67. This yieldable connection comprises an end loop extension 70 on the arm 66 loosely coupled with an elongated chain link 71. The transverse bar 52 or 53 of the grid plate 45 passes at each end loosely through the corresponding chain link 71, and is provided at each of its outer ends with a collar 72 to retain said chain link against outward displacement along said transverse bar. By means of the yieldable connections 67 between the grid plate 45 and its supporting arms 66, said grid plate is permitted to move vertically with respect to the lower ends of said supporting arms, and is also permitted to swing about the end loops 70. The weight of the grid 45 is ordinarily sufficient to hold down the articles in transit. Should there, however, occur an accidental piling up of the articles on the conveyor belt 11 this construction of the connections 67 permits said plate to be raised by the piled up articles sufficiently to permit them to continue passage through the chamber independently of the supporting arms 66.

To support each arm 66 in any desired angular position, while permitting said arm to swing counterclockwise as shown in Figs. 2 and 3, the sleeve 63 forms the hub of a bell crank 75, one arm 76 of which is pivotally connected at its outer end to an adjusting bar 77 extending along the inner side of the treating chamber 10, two of these bars being provided on opposite sides. The other bell crank arm 78 has a flange or bent portion 80 at its outer end engaging one edge of the supporting arm 66. This flange 30 serves as an abutment or rest to limit clockwise rotation of the arm 66 (Fig. 2), while permitting its free counterclockwise rotation. It is desirable to have these plate supporting arms 66 free to rotate counterclockwise, so that in case there is a large piling up of the articles, the grid plate 45 will yield further than is permitted by the connections 67 alone. Under these conditions, the arms 66 are caused to swing in a counterclockwise direction by the upward movement of the plate effected by the piled up articles and thereby prevent the plate 45 from interfering with said articles. After the interfering articles have cleared the rear end of the grid plate 45, the latter can return by gravity into its normal restricting position.

For adjusting the height of the grid plate 45 in accordance with the height of the articles being treated, there is provided at the front end and on the outside of the treating chamber 10 a handwheel 81 secured to one end of a shaft 82 suitably journalled and extending along one side of said treating chamber on the outside thereof. Fast to this shaft 82 is a worm 83 meshing with a worm wheel 84 affixed to one end of a shaft 85 extending horizontally from the outside of the treating chamber into and across the upper section of said chamber. This shaft 85 is supported on suitable bearings secured to the side walls 55, and has affixed thereto a pair of lever arms 86 pivotally secured to the adjusting rods 77 respectively. As the adjusting wheel 81 is turned in either direction, the shaft 85 is rotated in a corresponding direction to cause lengthwise movement of the adjusting rods 77. This movement of the rods 77 causes a corresponding rotating movement of the bell cranks 75 about their respective pivot supports 54, so that the grid plate supporting arms 66 are correspondingly angularly lowered or raised. This effects a corresponding change in the elevational position of the grid plate 45 with respect to the upper run of the conveyor belt 11.

The pivot supports 54 are suitably lubricated. For that purpose, each pivot stud 56 (Fig. 7) has an axial duct 87 and branch ducts 88 leading therefrom to the inner peripheries of the hub sleeves 62 and 63 respectively. Lubricating substance may be introduced into the lubricating ducts 87 and 88 by removing the screw stud 61 and attaching the fitting of a grease gun into the tapped hole of the pivot stud 56.

The air blast nozzles 27 and 28, Fig. 3, are supported in a manner described in U. S. Patent 2,334,854, to permit them to yield upwardly when pushed accidentally by the articles on the conveyor 11 without affecting the normal elevation of said nozzles. In this arrangement, each nozzle 27 and 28 is provided with supporting lugs 90 mounted at each end of the nozzle, and bearing against adjusting or actuating arms 91 fixed at their upper ends to support rings 92, which are rotatably fitted around bearing tubes 41. Each arm 91 is arranged so that its intermediate portion engages the lug 90 in substantially vertical position, the lower portion of said arm extending at right angles to the intermediate portion, each of the arms 91 having a pivotal connection 93 to a bar 94. Two of these bars 94 are provided on opposite sides of the chamber 10.

As another feature of the present invention, the adjustment of the drying nozzles 27 and 28 is effected simultaneously with the adjustment of the grid plate 45, so that both the grid plate and the drying nozzles will be elevationally adjusted at the same time, and to a similar extent in accordance with the height of the articles being treated. To that end, the adjusting bars 94 of the drying nozzles 27 and 28 are pivotally connected at their forward ends through the medium of connecting bars 95 to the lower end of arms 86 at 95a to which arms the rear ends of the adjusting bars 77 for the article restricting mechanism are also connected.

With the arrangement as described, as the handwheel 81 is turned in the proper direction, as for example, to increase the elevational position of the grid plate 45 with respect to the upper run of the conveyor belt 11, said plate is raised as already described, and the nozzles 27 and 28 are correspondingly angularly moved counterclockwise about their pivotal supports, thereby causing the air projecting ends of said nozzles to be correspondingly raised with respect to the upper run of the conveyor belt 11. The nozzles 27 and 28 are so supported that if any of them accidentally come in contact with an article on the conveyor 11, they will be pushed counterclockwise, so that the article is permitted to continue its movement. As soon as the article passes clear of the nozzles 27 and 28, these will be free to angularly gravitate back until the lug 90 engages the arms 91 to thus locate the nozzles in their adjusted position.

The circulating system for the wash and rinse comprises a tank 100 in the lower section of the treating chamber 10 disposed below the spray units 21, 22, 24 and 25 and is divided by a partition 101 into two compartments 101a and 101b, each compartment having a hinged cover 99 on the part thereof projecting from the side of the treating chamber 10. For supplying wash water in the tank section 101a to the spray units 21 and 22, there is provided on the outlet side of the tank section 101a, a pump 102 having an outlet 103 connecting into the lower end of a chest 104. This chest 104 is in the form of a box of rectangular horizontal and vertical cross-section rigidly built onto the side wall 105 of the tank 100, so that said tank wall forms one side of said chest. Connected to the upper end of the chest 104 is a vertical duct 106 which has a horizontal rectangular cross-section smaller than the full horizontal cross-section of the chest 104, and which is affixed to the chamber wall 105, so that said wall defines one side of said duct. At the upper end, the duct 106 extends into the wash compartment 20, and is connected to a chest 107 on one side of said compartment.

With the arrangement as described, the outlet pipe 103 from the pump 102 can be easily connected to the supply system leading to the two spray units 21 and 22 without straining this pipe 103 or said supply system.

The lower wash spray unit 21 communicates with the chest 104 by means of a fitting unit 108 connected at one end to an outlet opening 110 in said chest, and connected at its other end to the header 29 of said wash spray unit.

The flow into this wash spray unit 21 is controlled by means of a valve member 111 (Fig. 1a) fixed to a shaft 112 extending through a stuffing box 112a to the outside of the chest 104, and secured at its outer end to a suitable turning handle 113. By turning this handle 113, the valve member 111 may be moved across the outlet 110 to the desired extent to control flow of the wash water to the wash water spray unit 21.

The upper wash water spray unit 22 is connected to the upper chest 107. For that purpose, the header 32 of the upper spray unit 22 connects into the chest 107 through an adjustable connection in the form of a union fitting 117 of the standard type, permitting the header 32 to rotate when said union is loosened, and preventing rotation of said header when said union is tightened. The spray unit 22 is thereby mounted in such a way that it can be pivotally swung outwardly from the compartment 20 into the approximate position shown in dot and dash lines in Fig. 1 when the upper section of the chamber 10 is uncovered to give access to its interior. For that purpose, the header 32 at one end is secured to the chest 107 through a nipple 120 threaded at its ends into the side of said chest or welded thereto. The other end of the header is supported by a rotatable connection in the form of a pivot rod 121 fixed to a cap 122 threaded on to the header 32, and extending with a rotatable fit into a hole in a vertical partition 123 forming one end of the wash compartment. By means of this construction, the header 32 is not only suitably supported at its ends, but is supported in such a manner as to permit the free rotation of said header, and in turn, the swinging movement of the spray unit 22 out of the wash compartment 20 and into the approximate position shown in dot and dash lines in Fig. 1 when the union 117 is loosened, and said compartment uncovered.

The upper spray unit 22 may be installed by first sliding the pivot rod 121 through the hole in the partition 123 while said unit is inclined, downwardly from left to right in Fig. 2 and then lowering the raised or left end of the unit until it is opposite the section of the union 117 carried by the nipple 120. The union 117 is then screwed together and tightened.

To permit the swinging of the spray unit 22 upwardly into the dot and dash line position shown in Fig. 1, the wash water compartment 20 has a removable top. For this purpose, the chamber walls 123 and 124 bounding the ends of the wash compartment 20 have secured thereto by welding or other suitable means two angles 125 on the horizontal flanges of which is seated a cover plate 126. These angles 125 have vertical flanges which extend at their top a distance slightly below the top of the chamber 10 to permit a second cover plate 128 to be seated thereon substantially flush with the top of the chamber 10. The cover plate arrangement as shown forms an effective seal against the leakage of water fumes or other gases from the interior of the wash compartment 20, and also, at the same time, provides means whereby the two cover plates 126 and 128 can be easily removed to permit the upper spray unit 22 to be swung outwardly about the axis of the header 32 when the union 117 is loosened.

The rinse spray units 24 and 25 are similar in construction to the wash spray units 21 and 22. The lower rinse spray unit 24 has been described. The parts of the upper rinse spray unit 25 shown in Fig. 3 bear the same reference characters as the upper wash spray unit 22 with the letter a added. The circulating system for the rinse water to said rinse spray units 24 and 25 is located at the right side of the tank section 101b (Fig. 3) and is also similar to that for the wash spray units 21 and 22 already described the similar parts bearing the same reference characters with the letter a added. Similarly, the upper rinse spray unit 25 is mounted for swinging movement out of the rinse compartment 23, when the union on said unit is loosened and the cover plates on said compartment are removed, as already described.

The flow of rinsing water to the lower rinse spray unit 24 is controlled by a valve structure similar to that shown in Fig. 4, and operated from the handle 113 through the valve shaft 112 which extends to the rinse spray control valve, so that control to both of the lower spray units 21 and 24 may be simultaneously effected.

To permit occasional washing of the housing of the conveyor sprockets 12 in which material collects which produces an unsanitary condition, the outlet 103 may have a branch connection 133 controlled by a valve 134 and leading into said housing, Figs. 1, 2 and 4. Similar provision may be made for washing the housing of the conveyor sprocket 13 from the rinse water tank compartment.

Across the entrance opening 15 is a swinging entrance gate 135, Figs. 1, 2 and 8, which is disposed above a loading platform 136 along which the articles are moved towards the conveyor 11. The distance between the lower end of the swinging gate 135 and the loading platform 136 is adjusted so that the articles can pass through the opening 15 without obstruction by said swinging gate. For that purpose, this swinging gate 135 is pivotally connected to the lower end of a pair of similar opposed arms 137, the upper ends of which are supported on respective pivot studs 140, which may be like the pivot studs 56, similarly connected to the side walls of the chamber in a manner already described in connection with the pivot supports 54 for the levers 66 and 76. Rigid with each arm 137 through connection with corresponding pivot stud 140 is an arm 141, the free end of which is pivotally connected to the end of a corresponding adjusting bar 77. With this arrangement, as the grid plate 45 and the nozzles 27 and 28 are elevationally adjusted through manipulation of the wheel 81 as already indicated, the gate 135 is also simultaneously raised to a corresponding extent. It will be understood that the arms 137 and 141 may be constructed similar to the arms 66 and 75 so that the arm 137 may yield in one direction with reference to the arm 141.

In order to prevent the escape of fumes and gases from the interior of the chamber 10 through the entrance opening 15 along the side walls of said chamber, there is provided a hood 145 resting on the loading platform 136, and having side walls 146 adjacent to the side edges of the opening 147 (Fig. 1) in the front wall 150 of said chamber, and a top wall 148 seated along its front edge on a shoulder formed by an inclined flange 149 extending inwardly from the lower edge of said front chamber wall 150. Each of the side walls 146 of the hood 145 has a rear lower substantially vertical edge 151 and an upper inclined edge 152 connected to said lower vertical edge by a short substantially horizontal edge 153. To prevent escape of fumes and gases through the upper section of the hood 145, there is provided a baffle 154 extending across and connected to the lower edges of the two arms 137. In lowermost position of the gate 135, this baffle 154 has an upper section 156 extending substantially parallel and close to the corresponding edge 152 of the hood 145, a horizontal section 157 extending above, parallel and close to the corresponding edge 153 of said hood, and a lip 158 extending over the pivot support 159 for the swinging gate 135 and the upper edge of the latter. In this lowermost position of the gate 135, said gate will be close to the lower rear vertical edge 151 of the side hood walls 146.

With the arrangement as described, gases and fumes cannot escape through the opening defined by the hood 145, nor can these gases and fumes be by-passed out of the chamber along the side walls thereof. It will be observed that the walls 146 of the hood 145 form pockets 146a (Fig. 8), with the side walls 55 and front wall 150 of the treating chamber 10 and that the arms 141 work freely back and forth therein.

The entrance compartment 160 beyond the swinging gate 135 may be provided with a suction vent 161 to draw off the fumes or gases. The compartment 162 between the rinse compartment 23 and the drying compartment 26 may be similarly provided with a suction vent 164 for the same purpose.

In the form of the invention shown in Figs. 1 to 8, each cooperating pair of levers 66 and 75 is mounted on a comparatively short pivot stud, so that two adjusting bars 77 on each side of the treating chamber 10 are desirable to effect simultaneous balanced adjustment of the grid plate 45 on both sides thereof. In the modified construction shown in Fig. 9, instead of providing the pivot stud arrangement, such as that shown in Fig. 7, the two aligned lever arms 66 on opposite sides of the treating chamber 10 are supported for pivotal movement on a common shaft 170 extending horizontally across the upper section of said chamber, and supported on suitable bearings 171 and a corresponding aligned bell crank 75 is pinned or otherwise affixed to said shaft at one side thereof. With the arrangement of Fig. 9, only one adjusting bar 77 is necessary, and this is pivotally connected to the arm 76 of bell crank 75 on one side of the chamber 10. As this adjusting bar 77 is moved lengthwise, in a manner already described in connection with the construction of Figs. 1 to 8, the adjusting movement of the bell cranks 75 on one side of the chamber 10 is transmitted through the shafts 170 to the arm 78a on the other side of the machine, to pivot its associated arm 66 so that the adjusting movement of the grid plate 45 is balanced on both sides.

In Fig. 10 is shown diagrammatically a form of simplified treating chamber in which the drying and rinsing operations are eliminated, and a mere washing operation carried out. In this construction, there is provided a treating chamber 10a having a conveyor 11a, and two wash spray units 21a and 22a, the lower spray unit being disposed between the horizontal runs of the conveyor.

A restricting or hold down plate 45a of open structure similar to the grid plate 45 described in connection with the construction of Figs. 1 to 8, is supported by the lost motion connections 67a from lever arms 66a supported for pivotal movement from pivot supports 54a and shaft 85a. These lever arms 66a are retained in position against clockwise movement by means of the bell cranks 75a mounted on the pivot supports 54a, and each having one arm 76a pivotally connected to an adjusting bar 77a and the other arm engaging the corresponding lever arm 66a by arm 78a as previously described in connection with the form of the invention shown in Figs. 1 to 9. The shaft 85a upon which the bell cranks 75a and arms 66a at the rear of the machine are supported has connected thereto a worm wheel 84a meshing with a worm 83a on a shaft 82a on which is affixed a handwheel 81a. The operation of the restricting plate 45a and its adjustment is similar to that already described.

Figure 11:
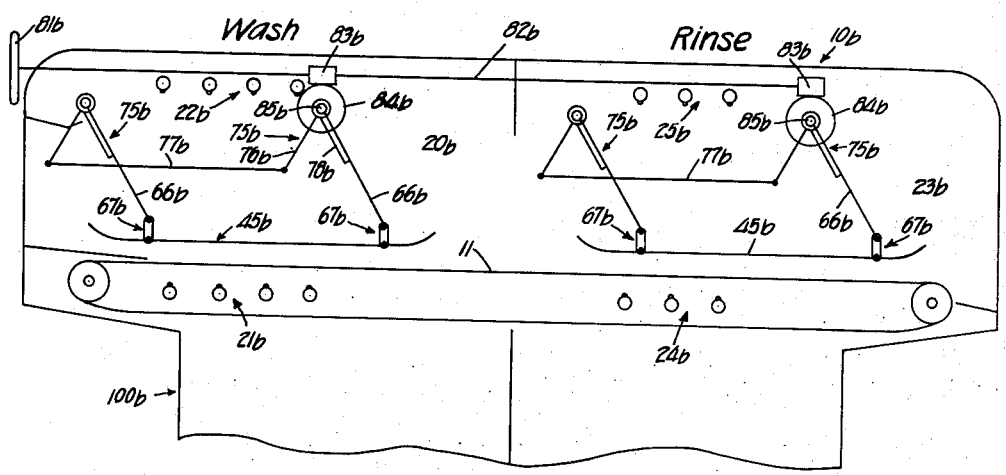
Fig. 11 is a diagrammatic view of still another form of machine in which both washing and rinsing operations are carried out, and in which separate mechanisms are provided for restricting the articles against vertical displacement while in transit through the washing and rinsing zones, these mechanisms being shown adjustable simultaneously from a single control device.

In the construction shown in Fig. 11, the treating chamber 10b is similar to that indicated in connection with the construction of Figs. 1 to 8, except that the drying operation is eliminated, and the treatment of the articles in the chamber is confined to mere washing and rinsing steps. In this construction, the treating chamber 10b is divided into a wash compartment 20b and a rinse compartment 23b, and instead of having one single grid plate 45a extending through the washing and rinsing zones, there are provided two separate similar article restricting or hold down plates 45b one in each of said compartments. The elevation of these article restricting plates 45b is adjusted simultaneously from the adjusting bars 77b through lever arm and bell crank linkages 66b and 75b operated from a handwheel 81b driving one shaft 85b in each of the two compartments 20b and 23b through transmissions including worm wheels 84b on shafts 85b.

The operation of the construction shown in Fig. 11 is similar to that above described in connection with the construction of Fig. 10.

In the embodiment of the invention shown in Figs. 12 and 13, a modified form of circulating system to the spray units 21, 22, and to spray units corresponding to the spray units 24 and 25 of Figs. 1-8 is provided. This modified form of circulating system has separate valves for the wash spray unit 21 and the rinse spray unit 24, but is nevertheless less costly to construct than the circulating system of Figs. 1 to 9. In the form of the invention shown in Figs. 12 and 13, the pump 102 has an outlet 180 with a lower branch pipe 181 provided with a control valve 182, and passing through the side wall of the treating chamber 10a. Inside the treating chamber 10a, the lower branch pipe 181 is connected to the header 29 of the lower wash spray unit 21.

The pump outlet 180 also has an upper branch pipe 183 passing through the side wall of the treating chamber 10a, and connected inside said chamber to the union 117, which permits the header of the upper wash spray unit 22 to rotate when said union is loosened, and prevents rotation of said header when said union is tightened.

The rinse spray units are similar in construction to the wash spray units 21 and 22, and are supplied by a circulating system similar to that described in connection with said wash units.

In the form of the invention shown in Figs. 12 and 13, the shaft 82c, instead of extending along the outside of the treating chamber 10a, as in the construction of Figs. 1 to 9, extends through said chamber, and has a hand wheel 81c secured to one end of said shaft at the front of the machine. By means of this construction, the outside brackets, ball bearings and other fixtures for supporting the shaft 82c are eliminated or reduced, and construction costs are minimized. With this modified form of the invention, holes are cut through the baffles or partitions in the chamber 10a to permit the shaft 82c to pass therethrough. At the inner end, the shaft 82c would have a suitable bearing, such as a pair of brass bushings, and at its forward end, it would have a similar bearing.

The shaft 82c mounted inside the treating chamber 10a not only reduces the cost of construction, but also serves as a support and a stop for the upper wash spray unit 22 and the rinse spray unit corresponding to the spray unit 25 in Figs. 1–8 when these units are swung downwardly in the horizontal position shown.

In the modified construction of Figs. 12 and 13, the swinging entrance gate 135a is pivotally connected to the lower end of a pair of similar opposed arms 137a, the upper ends of which are affixed to a shaft 140a supported in suitable bearings on the side walls of the treating chamber 10a. Between this shaft 140a and the shaft 82c is a worm and worm wheel transmission 185.

As the grid plate 45 and the nozzles 27 and 28 shown in Figs. 1–8 are rotationally adjusted through manipulation of the hand wheel 81c, Figs. 12 and 13, in the manner indicated in connection with the construction of Figs. 1 to 9, the gate 135a is also simultaneously raised to a corresponding extent.

In order to reduce the escape of fumes and gases from the interior of the chamber 10a through the entrance opening of the chamber, there is provided a baffle 156a secured to the arms 137a and extending therebetween across substantially the full width of said opening.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

We have described what we believe to be the best embodiments of our invention. We do not wish, however, to be confined to the embodiments shown, but what we desire to cover by Letters Patent is set forth in the appended claims.

We claim:

1. In combination, a conveyor having an upper run for supporting articles, means for projecting a fluid upwardly against said articles while in transit on said upper conveyor run, a grid member above said conveyor run and substantially parallel thereto for limiting upward displacement of said articles on said conveyor run resulting from the force of said fluid, a plurality of substantially parallel pivotally suspended lever arms of substantially equal length pivotally connected to said member for supporting said member, said lever arms being free to swing in an angular direction to permit said member to yield with the transit articles in case said articles come in contact with said member while in transit on said conveyor run, said combination comprising abutment means supporting said lever arms against angular movement in the opposite direction, and means for adjusting said abutment means to adjust the angular position of said lever arms and thereby adjust the elevational position of said member with respect to said conveyor.

2. In combination, a conveyor for articles, means for projecting a fluid upwardly against said articles while in transit, means limiting upward displacement of said articles on said conveyor resulting from the force of said fluid, comprising a substantially horizontal plate above said conveyor, a plurality of plate supporting lever arms pivotally secured near one end to said plate and suspended near their other ends for free pivotal movement in a direction to permit said plate to yield with the transit articles in case said articles come in contact with said plate, an endwise movable rod, bell cranks supported for pivotal movement about axes coextensive with the suspension pivotal axes of said lever arms, each of said bell cranks having an arm pivotally secured to said rod, and its other arm with an abutment conformation supporting one of the said suspended lever arms against pivotal movement in the opposite direction, and means for adjusting said rod endwise to adjust the elevation of said plate.

3. In combination, a conveyor having an upper run for supporting articles, means for projecting a fluid from above and below against said articles while in transit on said conveyor run, a grid member above said conveyor run and substantially parallel thereto for limiting upward displacement of said articles on said conveyor run resulting from the force of said fluid, arms for supporting said member, and individually yieldable lost-motion connections between said arms and said member permitting said member to move vertically to a limited extent with respect to said arms and also to swing to a limited extent about said arms.

4. The combination, as defined in claim 3, said member comprising bars extending transversely thereof from opposite sides, each of said connections including a chain link connected to one end of a corresponding arm, each of said bars passing through a corresponding link and having a loose slide fit therein for free movement therealong.

5. The combination as described in claim 3, said grid member comprising a series of longitudinal bars extending along said conveyor run and transverse bars attached to the upper side of said series of longitudinal bars for holding said longitudinal bars in spaced relationship and projecting at their ends beyond the outside longitudinal bars, each of said connections including a chain link connected to one end of a corresponding arm, each of said transverse bars at its projecting end passing through a corresponding link and having a loose slide fit therein for free movement therealong.

6. The combination as described in claim 3, said member comprising bars extending transversely thereof from opposite sides, each of said connections including a loop connected to one end of each arm near said member, and a chain link loosely coupled to said loop, each of said bars passing through a corresponding link and having a loose slide fit therein for free movement therealong.

7. The combination, as defined in claim 3, said arms being pivotally supported near one end and carrying said yieldable connections near the other end.

ERICH R. ZADEMACH.
WILLIAM W. CLARKE.

(References on following page)

References Cited in the file of this patent

UNITED STATES PATENTS

| Number | Name | Date |
|---|---|---|
| 803,097 | De Laney | Oct. 13, 1905 |
| 816,604 | Russell | Apr. 3, 1906 |
| 1,090,845 | Goss et al. | Mar. 24, 1914 |
| 1,130,015 | Paul | Mar. 2, 1915 |
| 1,215,375 | Hooper | Feb. 13, 1917 |
| 1,356,573 | Wallace | Oct. 26, 1920 |
| 1,373,324 | Gomez | Mar. 29, 1921 |
| 1,613,296 | Seaman | Jan. 4, 1927 |
| 1,694,734 | Cutler | Dec. 11, 1928 |
| 2,148,117 | Gettig | Feb. 21, 1939 |
| 2,175,677 | Zademach | Oct. 10, 1939 |
| 2,226,641 | Sonntag | Dec. 31, 1940 |
| 2,229,605 | Snyder et al. | Jan. 21, 1941 |
| 2,250,238 | Smith | July 22, 1941 |
| 2,268,900 | Read | Jan. 6, 1942 |
| 2,328,504 | Smith | Aug. 31, 1943 |
| 2,334,854 | Zademach | Nov. 23, 1943 |
| 2,420,520 | Carsey et al. | May 13, 1947 |